United States Patent
De Blasio et al.

(10) Patent No.: US 9,668,150 B2
(45) Date of Patent: May 30, 2017

(54) SYSTEM AND METHOD FOR SELECTIVE PROTECTION SWITCHING

(75) Inventors: Giuseppe De Blasio, Rome (IT); Giorgio Barzaghi, Vaprio d'Adda (IT); Andrea Galbiati, Vimercate (IT); Dalmazio Mandich, Vimercate (IT)

(73) Assignee: Alcatel Lucent, Boulogne-Billancourt (FR)

( * ) Notice: Subject to any disclaimer, the term of this patent is extended or adjusted under 35 U.S.C. 154(b) by 253 days.

(21) Appl. No.: 14/344,672

(22) PCT Filed: Aug. 14, 2012

(86) PCT No.: PCT/EP2012/065903
§ 371 (c)(1),
(2), (4) Date: May 5, 2014

(87) PCT Pub. No.: WO2013/041307
PCT Pub. Date: Mar. 28, 2013

(65) Prior Publication Data
US 2014/0369182 A1 Dec. 18, 2014

(30) Foreign Application Priority Data
Sep. 19, 2011 (EP) .................................... 11306177

(51) Int. Cl.
*H04W 24/04* (2009.01)
*H04W 72/04* (2009.01)
(Continued)

(52) U.S. Cl.
CPC ........... *H04W 24/04* (2013.01); *H04L 1/0002* (2013.01); *H04L 1/0003* (2013.01);
(Continued)

(58) Field of Classification Search
None
See application file for complete search history.

(56) References Cited

U.S. PATENT DOCUMENTS

| 8,817,716 B2* | 8/2014 | Clima | H04B 1/74 370/329 |
| 2002/0027881 A1* | 3/2002 | Castellano | H04L 1/20 370/252 |

(Continued)

FOREIGN PATENT DOCUMENTS

| CN | 100382537 | 4/2008 |
| CN | 101777964 | 7/2010 |

(Continued)

*Primary Examiner* — Ayaz Sheikh
*Assistant Examiner* — Tarell Hampton
(74) *Attorney, Agent, or Firm* — Patti & Malvone Law Group, LLC

(57) ABSTRACT

For transmitting packets over radio communication links wherein flows of packets are delivered containing protected packets and unprotected packets, the status of propagation of the packets is verified in order to detect the presence of a faulty condition. If no faulty condition is detected, protected packet are transmitted over a first radio link wherein the transmission occupies a first portion of available bandwidth on the first radio link, and unprotected packets are transmitted on at least part of the remainder of the available bandwidth of the first radio link and at least part of available bandwidth the second radio link. If a faulty condition is detected, a protected packet is transmitted over the first radio link wherein the transmission occupies a first portion of available bandwidth on the first radio link, a duplicate of the protected packet is transmitted over the second radio link wherein said transmission occupies a second portion of available bandwidth on the second radio link, and unprotected packets are transmitted on at least part of the remainder of the available bandwidth of the first radio link and at least part of the remainder of the available bandwidth of the second radio link.

11 Claims, 3 Drawing Sheets

(51) Int. Cl.
*H04L 1/00* (2006.01)
*H04W 76/02* (2009.01)
*H04L 5/00* (2006.01)
*H04L 1/02* (2006.01)
*H04L 1/22* (2006.01)
*H04L 1/20* (2006.01)
*H04L 12/24* (2006.01)
*H04L 12/707* (2013.01)
*H04B 17/17* (2015.01)

(52) U.S. Cl.
CPC .............. *H04L 1/0009* (2013.01); *H04L 1/02* (2013.01); *H04L 1/203* (2013.01); *H04L 1/22* (2013.01); *H04L 41/0668* (2013.01); *H04L 45/24* (2013.01); *H04W 76/025* (2013.01); *H04B 17/17* (2015.01); *H04L 5/003* (2013.01); *H04L 2001/0096* (2013.01); *H04W 72/0453* (2013.01)

(56) References Cited

U.S. PATENT DOCUMENTS

| | | | | |
|---|---|---|---|---|
| 2004/0141502 | A1* | 7/2004 | Corson | H04W 84/12 370/389 |
| 2004/0258047 | A1* | 12/2004 | Miao | H04L 7/005 370/352 |
| 2006/0013210 | A1* | 1/2006 | Bordogna | H04L 45/00 370/389 |
| 2006/0013584 | A1 | 1/2006 | Miyazaki | |
| 2008/0123553 | A1* | 5/2008 | Boyina | H04W 24/04 370/254 |
| 2010/0121413 | A1* | 5/2010 | Willerton | A61N 1/3706 607/60 |
| 2011/0149900 | A1* | 6/2011 | Clima | H04B 1/74 370/329 |
| 2011/0170419 | A1* | 7/2011 | Zhang | H04L 1/0025 370/241 |

FOREIGN PATENT DOCUMENTS

| | | | | |
|---|---|---|---|---|
| CN | 102138286 | | 7/2011 | |
| EP | 1355434 | | 10/2003 | |
| EP | 1471673 | | 10/2004 | |
| EP | 2197142 | | 6/2010 | |
| FR | EP 2197142 | A1 * | 6/2010 | ............. H04L 1/007 |
| JP | EP 0889601 | A2 * | 1/1999 | ............. H04B 1/74 |
| JP | 2002261854 | | 9/2002 | |
| JP | 2003124980 | | 4/2003 | |
| JP | 2006033319 | | 2/2006 | |
| JP | 2010177738 | | 8/2010 | |
| SE | WO 2010022792 | A1 * | 3/2010 | ............. H04B 1/74 |
| WO | WO 0013376 | A1 * | 3/2000 | ............. H04L 1/22 |
| WO | 2010022792 | | 3/2010 | |

* cited by examiner

SYSTEM AND METHOD FOR SELECTIVE PROTECTION SWITCHING

TECHNICAL FIELD

The present invention relates to protection switching of packets transmitted over radio links.

BACKGROUND ART

Protection switching is widely known in radio communications. In general terms, protection switching is a mechanism used in a communications network in order to ensure connectivity in case of failure or malfunction of a network element or a link involved in transmission or reception of data from one end of the network to another. One of the widely used protection schemes typically involves using a main channel and a protection channel.

Recently, techniques have been developed in order to transmit packets over radio links. Such type of transmission also would typically require a protection mechanism. The known techniques for protection switching of packets over radio links typically make use of two radio channels of the radio link based on a 1+1 linear protection switching architecture or a 1:1 linear protection switching architecture.

SUMMARY

When the signal to be protected is a flow of packets—a situation that is becoming more and more frequent in mobile backhauling networks—these protection switching architectures are typically used in the following manner:

In the 1+1 case of protection of flows, the flow of packets at the transmitting side is reproduced (copied) in order to generate a second flow substantially identical to the original flow and the two flows are transmitted through the two channels, one through the main or the working channel and the other through the protection channel (these channels may also be referred to as transport entities).

At the receiving side, the flow which is received from a transport entity that is experiencing either no faulty condition, or a faulty condition (signal degradation or signal failure) which is considered of low significance, thus presenting a better quality than the flow received on the other channel, is selected and made available at the receiving interface.

In the 1:1 case of protection of flows, the flow of packets at transmitting side feeds only the working transport entity for transmission. The protection transport entity is maintained on standby and is used only in case of need, when the working transport entity experiences a faulty condition.

At the receiving side, if it is detected that the working transport entity is experiencing a faulty condition (signal degradation or signal failure) worse than the protection transport entity, the flow of packets at transmitting side is switched from the working transport entity to the protection transport entity. In the 1:1 case, a coordination scheme between transmitting side and receiving side is needed in order to select the same transport entity.

Herein the term unprotected is to be understood to refer to a packet or a flow of packets, as the case may be, which is intended to be transmitted over a radio link without a requirement of protecting the data carried by such packet or flow.

One problem associated with the techniques described in the above two examples, is that typically it is not possible to transport an unprotected flow of packets regardless of the status of the protection switching because:

in the 1+1 case, the two transport entities are only used to transport the protected flow; and in the 1:1 case, the protection transport entity which is not usually used to transport the protected flow can in principle be used to carry an unprotected flow, however in case of switching the transmission of the protected flow to the protection transport entity (which may occur when the working transport entity experiences a defect condition) the unprotected flow is not transmitted and therefore lost.

The above described techniques therefore do not make optimum use of radio resources.

A solution for improving the use of radio resources has been proposed in European Patent Application number 08305941.0 filed on 15 Dec. 2008 in the name of Alcatel Lucent. According to this solution, protected and unprotected flows of packets are carried over a radio link by implementing a selective radio protection scheme for packets in which the protected packets are transmitted over a first radio link and a duplicate of the protected packet is transmitted over a second radio link. Further, some unprotected packets are transmitted over the first radio link and some other unprotected packets are transmitted over the second radio link.

Some embodiments feature a method of transmitting packets over radio communication links, wherein at least a first radio link and a second radio link are used for delivering flows of packets, said flows of packets containing protected packets and unprotected packets, the method comprising:

verifying a status of propagation of the packets on the first radio link and the second radio link in order to detect presence of a faulty condition or to estimate a bit error rate;

if no faulty condition is detected or if the bit error rate is estimated to be below a minimum threshold level, transmitting a protected packet over the first radio link wherein said transmission occupies a first portion of available bandwidth on the first radio link, and transmitting unprotected packets on at least part of the remainder of the available bandwidth of the first radio link and at least part of available bandwidth the second radio link; and if a faulty condition is detected or if the bit error rate is estimated to be above the minimum threshold level, transmitting a protected packet over the first radio link wherein said transmission occupies a first portion of available bandwidth on the first radio link, transmitting a duplicate of the protected packet over the second, radio link wherein said transmission occupies a second portion of available bandwidth on the second radio link, and transmitting unprotected packets on at least part of the remainder of the available bandwidth of the first radio link and at least part of the remainder of the available bandwidth of the second radio link.

According to some embodiments, the transmission on the first radio link and the second radio link is performed using adaptive modulation and coding.

According to some embodiments, a modulation scheme used for transmission on the first radio link is chosen independently from the modulation scheme used for transmission on the second radio link.

According to some embodiments, a modulation scheme is selected so as to ensure a reliable transmission of protected packets.

According to some embodiments, verifying the status of propagation of the packets on the first radio link and the second radio link comprises sampling a mean square error and a forward error correction stress of the signal.

Some embodiments feature a transmitter for transmitting packets over radio communication links, said packets containing protected packets and unprotected packets, the transmitter comprising:
- a classifier for detecting packets to be protected in transmission and packets not to be protected in transmission;
- a marking unit for identifying and marking the packets;
- a duplicator for duplicating the packets to be protected;
- a drop unit for dropping unprotected packets;
- a modulation selector for applying a modulation scheme to a radio link, said modulation scheme being selected at least according to a status of propagation of packets on a radio link.

Some embodiments feature a receiver for receiving packets over radio communication links, said packets containing protected packets and unprotected packets, the receiver comprising:
- a link estimation unit for estimating a status of the radio link and associating to a packet an indicator representing the status of the radio link;
- a demultiplexer for separating a multiplexed flow of packets into a protected flow and unprotected flow;
- a selector unit for selecting a flow according to a link quality of said flow.

According to some embodiments the link estimation unit is configured for estimating the status of the radio link by sampling mean square error and forward error correction stress.

Some embodiments relate to a radio communication network comprising the transmitter and the receiver as featured herein.

Herein a radio link may be for example a radio channel.

These and further features and advantages of the present invention are described in more detail in the following description as well as in the claims with the aid of the accompanying drawings.

DETAILED DESCRIPTION OF EMBODIMENTS

Figure 1:
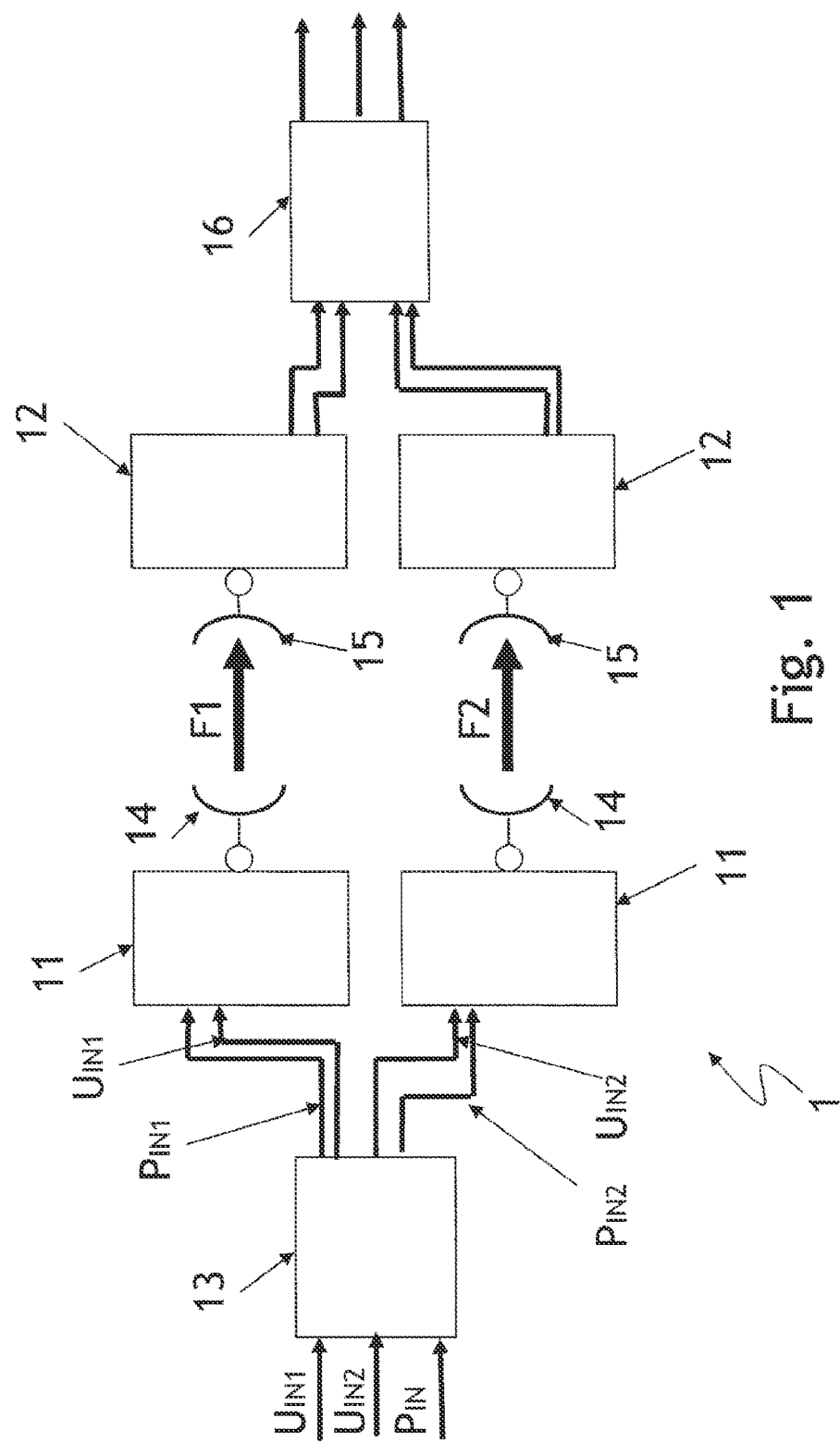
FIG. 1 is an exemplary schematic representation of a radio communication system comprising transmitters and receivers configured to perform protection switching at transmitting side according to embodiments of the invention.

For a better understanding of the solution proposed herein, a radio system is considered comprising two radio channels with different frequency and bandwidth and capable of using adaptive coding modulation (ACM) to implement a 1+1 linear protection scheme for traffic with reliable delivery (protected packets) and no protection for traffic with unreliable delivery (unprotected packets) with the aim of having the radio capacity provided by the two channels as fully utilized as possible.

The implementation of this radio system may allow for achieving a protection of traffic with reliable delivery in case of failures in radio propagation or in hardware, providing the possibility of hitless switching for the protected traffic flows.

According to embodiments featured herein, the protection of traffic with reliable delivery is guaranteed for a committed bandwidth at a specific level of modulation scheme (which may be determined on a case by case basis). Furthermore, the bandwidth further available (remainder of the bandwidth not occupied by the protected traffic), either at higher modulation schemes, or bandwidth left available by throughput fluctuation of protected traffic, can be selectively used for transmitting unprotected packets.

This may be done by transmitting the traffic with unreliable delivery, unprotected over the available bandwidth of the two radio channels. Some portion of the traffic may be transmitted over a bandwidth on one radio channel and some other portion may be transmitted over a bandwidth on the second radio channel in a static way.

Herein, a static way of transmission is meant to refer to transmission assigned by provisioning, for example according to VLAN or MPLS labeling.

Alternatively, by performing a dynamic load balancing of the traffic with transmission of unprotected packets over the two radio channels a still more efficient use of the resources may be obtained. Dynamic load balancing may be performed by using a known distribution algorithm according to which loading of channels is performed based on the available capacity on them.

Embodiments of the invention provide the possibility of determining how to use the radio resources in view of the propagation conditions as described below.

In order to determine how to allocate protected and/or unprotected packets to radio links, the status of the propagation of the packets over the radio link is verified in order to detect the presence or absence of a faulty condition. Such status may be mainly related to the level of degradation to which the transmitted packets may be subject to. For example such status may be verified by sampling the mean square error (MSE) and the forward error correction (FEC) stress of the signal at the reception of the packet and the relevant information on such status may be attached to the packet by known mean.

Furthermore an estimation of the status of the propagation of the packets over the radio link based on a bit error rate (BER) may be performed. This may allow for determining the status of the channel propagation conditions. If the estimated level of BER is below a minimum threshold, it may be assumed that the channel propagation conditions are satisfactory (or good); likewise if the estimated level of BER is above a minimum threshold, it may be assumed that the channel propagation conditions are unsatisfactory (or bad).

For example the BER minimum threshold may be considered to be about 1 e-9. Therefore an estimated BER above the latter value my be considered to represent bad channel propagation conditions and an estimated BER below said value would be considered to represent good channel propagation conditions.

Thus the status of propagation may be detected to be under normal conditions which is where no substantial faulty condition is detected in the propagation of the packets, or under faulty conditions which may be caused by a variety of phenomena, for example by adverse weather conditions or hardware failure. Herein, by no substantial faulty condition it is meant to refer to a status of propagation in which either no fault is detected at all, or if fault is detected the level of degradation caused by such fault is still within a limit considered as acceptable for ensuring a minimum level of transmission quality.

As mentioned above, some known solutions propose duplicating the protected packets and transmitting the protected packets on one link and transmitting the duplicated protected packets on another link. Embodiments of the invention allow for activating such duplication when needed, or when it is determined by the user, for example when a failure is detected in the radio channel which may require to bring the modulation scheme at lower level (in an adaptive mode operation).

In relation to the figures it is noted that, for the sake of simplicity, only the blocks that are considered relevant for the understanding of the present description and claims are shown.

Referring now to FIG. 1 an exemplary schematic representation of a radio communication system 10 comprising transmitters 11 and receivers 12 is shown. The transmitters 11 and receivers 12 use respective antennas 14 and 15 for respectively transmitting and receiving flows. The radio communication system 10 is bi-directional and is configured to perform selective protection switching at any of the transmitting sides according to embodiments of the invention. However, for simplicity, the figure only shows one direction of transmission (left to right in the figure).

Flows of protected packets $P_{IN}$ may be fed into a traffic duplicator 13 which is in charge of producing a duplicate of incoming packets $P_{IN}$ thereby providing at its output a first flow of protected packets $P_{IN1}$ and a second (duplicate) flow of protected packets $P_{IN2}$.

By duplicating packets (or flows of packets) it is meant to refer to reproducing from a first packet (or a first flow of packets) a second packet (or a second flow of packets) containing exactly the same, or substantially identical, information as the first packet (or flow of packets).

The first flow of protected packets $P_{IN1}$ is input into a first transmitter and the second flow of protected packets $P_{IN2}$ is fed into a second transmitter (both transmitters are shown by reference numeral 11).

Flows of unprotected packets $U_{IN1}$ and $U_{IN2}$ may also be fed into a traffic duplicator 13 which provides such flows respectively at the input of the first transmitter and the second transmitter 11 as shown in the figure. The latter transmitters 11 are configured to transmit the unprotected packets $U_{IN1}$ and $U_{IN2}$ over respective channels.

Flows of packets (either protected or unprotected) may comprise any number of packets as a particular application would require.

Under normal propagation conditions (no substantial faulty condition), it may not be needed to transmit both the protected flows $P_{IN1}$ and $P_{IN2}$ because transmission over one radio channel, say F1 in the figure, will suffice to ensure continuity of transmission. Therefore in such normal conditions, one of the protected flows (say flow $P_{IN2}$) is not transmitted thereby leaving the corresponding part of the bandwidth that the duplicate flow would have otherwise occupied, free for use. This free and available bandwidth becomes therefore usable for transmitting unprotected packets. Therefore while at least a part of the bandwidth on the channel F1 is used for carrying protected packets $P_{IN1}$ the bandwidth available on other (second) channel $F_2$ may be used, entirely or as much as needed, for conveying unprotected packets.

Furthermore, the protected flow $P_{IN1}$ conveyed on the first radio channel F1 may not require the use of the entire bandwidth available on said first radio channel F1. If this is the case, the remainder of the unused bandwidth available on the first radio channel F1 would also be usable for transmission. Such remained of the bandwidth available on the first radio channel F1 may then be used for conveying unprotected flows of packets.

In case a faulty condition occurs, and as the protected packets need to be transmitted with reliability as much as possible, the second channel $F_2$ may be used for transmitting the duplicate of the protected flows, namely flow $P_{IN2}$, thus ensuring higher reliability in transmission.

In such case, any remaining bandwidth (bandwidth not used for conveying protected flows) available on the first channel F1 and/or on the second channel F2 may be used for transmitting unprotected flow of packets. The flows of protected and unprotected packets are transmitted by transmitters 11 toward the receiving end using antennas 14. Further detail in relation to the transmitting end is provided below in relation to FIG. 2.

The flows of protected and unprotected packets are then received by receiver 12 through antennas 15 and fed into a traffic selector 16 which selects and reassemble the packet as will be described in further detail below in relation to FIG. 3.

It is to be noted that the modulation scheme used for transmitting the protected packets may preferably be different from the modulation scheme used for transmitting unprotected packets. However, the transmission on one single channel would be done using a single modulation scheme. This means that if part of the bandwidth available on a channel is used for conveying protected packets and another part is used for conveying unprotected packets, then a transmission of such a channel comprising both protected and unprotected packets would be performed under one and the same modulation scheme.

Preferably, protected packets may be transmitted at a lower, more reliable, modulation scheme (for example at 4, 16 or 64 QAM). If such protected packets are transmitted using a channel which is also conveying unprotected packets, the modulation scheme for such transmission is preferably selected so as to ensure reliable modulation for the protected packets.

If, on the other hand, a channel is only conveying unprotected packets, such transmission may be at a higher, less reliable, modulation scheme (for example 128 QAM and beyond).

Therefore in case a faulty condition occurs and a channel previously used only for transmitting unprotected packets at a higher modulation scheme needs to be used for transmitting protected packets (at least in part of the bandwidth available on the channel), the modulation scheme on this channel may also be changed to a lower scheme thereby ensuring a better quality and security for transmission. Such changes in modulation scheme may preferably be performed by using adaptive coding modulation (ACM) which is a known technique in the related art.

The radio channels $F_1$ and $F_2$ may be used independently of each other, meaning that each channel may be used for transmitting protected or unprotected packets (or a combination thereof) and may be subject to changes in modulation scheme according to the type of packets (protected or unprotected or a combination thereof) they are assigned to convey without regard to the other channels. This possibility provides great flexibility in making use of the radio resources in a dynamic manner while allowing for a reliable transmission of protected packets.

The system attempts to ensure that the packets belonging to the traffic with reliable delivery (protected packets), are as much as possible, always delivered. This would imply, for a correct operation of the system, that the maximum rate of the protected traffic be less than or equal to the minimum bandwidth of the radio link, hence the radio bandwidth of the lowest modulation scheme (e.g. 4 QAM).

The packets belonging to the traffic with unreliable delivery (unprotected packets) are delivered using the remaining bandwidth left available over each radio channel.

The following non-limiting examples are provided in order to describe in further detail how the radio resources are efficiently used according to some embodiments.

The following conditions are assumed:
two radio channels F1 and F2 are used;
the reference modulation scheme is 4 QAM;
ACM technique is used having modulation schemes within a range of 4 QAM to 128 QAM;
the available bit rate capacity may vary from 40 Mbps to 150 Mbps; and
the rate of traffic with reliable delivery (protected packets) is 30 Mbps.

In a first scenario a modulation scheme of 128 QAM is used for both channels assuming that such scheme may allow for 150 Mbps capacity of bandwidth available on each channel. Channel F1 may be used as the only channel for conveying protected flows. In such case 30 Mbps of bandwidth available on channel F1 is used for transmitting protected flows. The remaining 120 Mbps of (unused) bandwidth available on channel F1 may be used for transmitting unprotected flows. Furthermore, the entire bandwidth available on channel F2, namely 150 Mbps, may also be used for transmitting unprotected flows.

In a second scenario a modulation scheme of 16 QAM is used for channel F1 assuming that such scheme may allow for 80 Mbps capacity of bandwidth available and it is assumed that F1 is experiencing some level of degradation for example due to bad propagation conditions. Furthermore, a modulation scheme of 128 QAM is used for channel F2 assuming that such scheme may allow for 150 Mbps capacity of bandwidth available. Channel F1 is used for conveying protected flows such that 30 Mbps of bandwidth available on channel F1 is used for transmitting such protected flows. The remaining 50 Mbps of bandwidth available on channel F1 may therefore be used for unprotected flows. It is also assumed that channel F2 is also set to transmit protected flows (as channel F1 is experiencing some degradation due to bad propagation conditions) which may be a duplicate of the protected flows transmitted on channel F1. In this, case the remaining 120 Mbps bandwidth available on channel F2 may also be used for transmitting unprotected flows.

In a third scenario a modulation scheme of 64 QAM is used for channel F1 assuming that such scheme may allow for 120 Mbps capacity of bandwidth available and a modulation scheme of 128 QAM is used for channel F2 assuming that such scheme may allow for 150 Mbps capacity of bandwidth available. Channel F1 is used for conveying protected flows such that 30 Mbps of bandwidth available on channel F1 is used for transmitting such protected flows. The remaining 90 Mbps of bandwidth available on channel F1 may therefore be used for unprotected flows. It is further assumed that channel F2 is set to transmit unprotected flows. In this case, similar to the first scenario, the entire bandwidth available on channel F2, namely 150 Mbps, may also be used for transmitting unprotected flows.

In a forth scenario a modulation scheme of 4 QAM is used for channel F1 as well as for channel F2 assuming that such scheme may allow for 40 Mbps capacity of bandwidth available on each channel. Channel F1 is used for conveying protected flows such that 30 Mbps of bandwidth available on channel F1 is used for transmitting such protected flows. The remaining 10 Mbps of bandwidth available on channel. F1 may therefore be used for unprotected flows. Likewise, Channel F2 is used for conveying protected flows such that 30 Mbps of bandwidth available on channel F2 is used for transmitting such protected flows. The remaining 10 Mbps of bandwidth available on channel F2 may therefore be used for unprotected flows.

Therefore, taking as reference a scenario with a mixture of traffic with reliable delivery and traffic with unreliable delivery (for example in case of backhauling of DSLAM Ethernet traffic) and assuming that 20% of, the traffic is to be protected (for example for VoIP or Management services), 80% of the traffic may be transmitted unprotected (for example Internet services) and a radio link at 150 Mbps under normal propagation conditions are available, the following comparison may be done:

In the conventional systems using 1+1 protection scheme, 30 Mbps of the resources is typically (rigidly) reserved for traffic with reliable delivery and 120 Mbps is typically (rigidly) reserved for traffic with unreliable delivery. In any case, the traffic is typically duplicated on the two cannels F1 and F2, therefore the maximum capacity available for traffic with unreliable delivery is 120 Mbps.

On the contrary, according to embodiments proposed herein, using selective flow protection and ACM, 0 to 30 Mbps is guaranteed (but not pre-assigned) for traffic with reliable delivery. This bandwidth may be used when needed for example on channel F1. However, 120 to 150 Mbps still remains available also on channel F1. Furthermore, 150 Mbps is also available on channel F2. This yields a capacity of up to 270 Mbps which may be used for traffic with unreliable delivery (unprotected packets) representing a substantial improvement in using radio resources.

Figure 2:
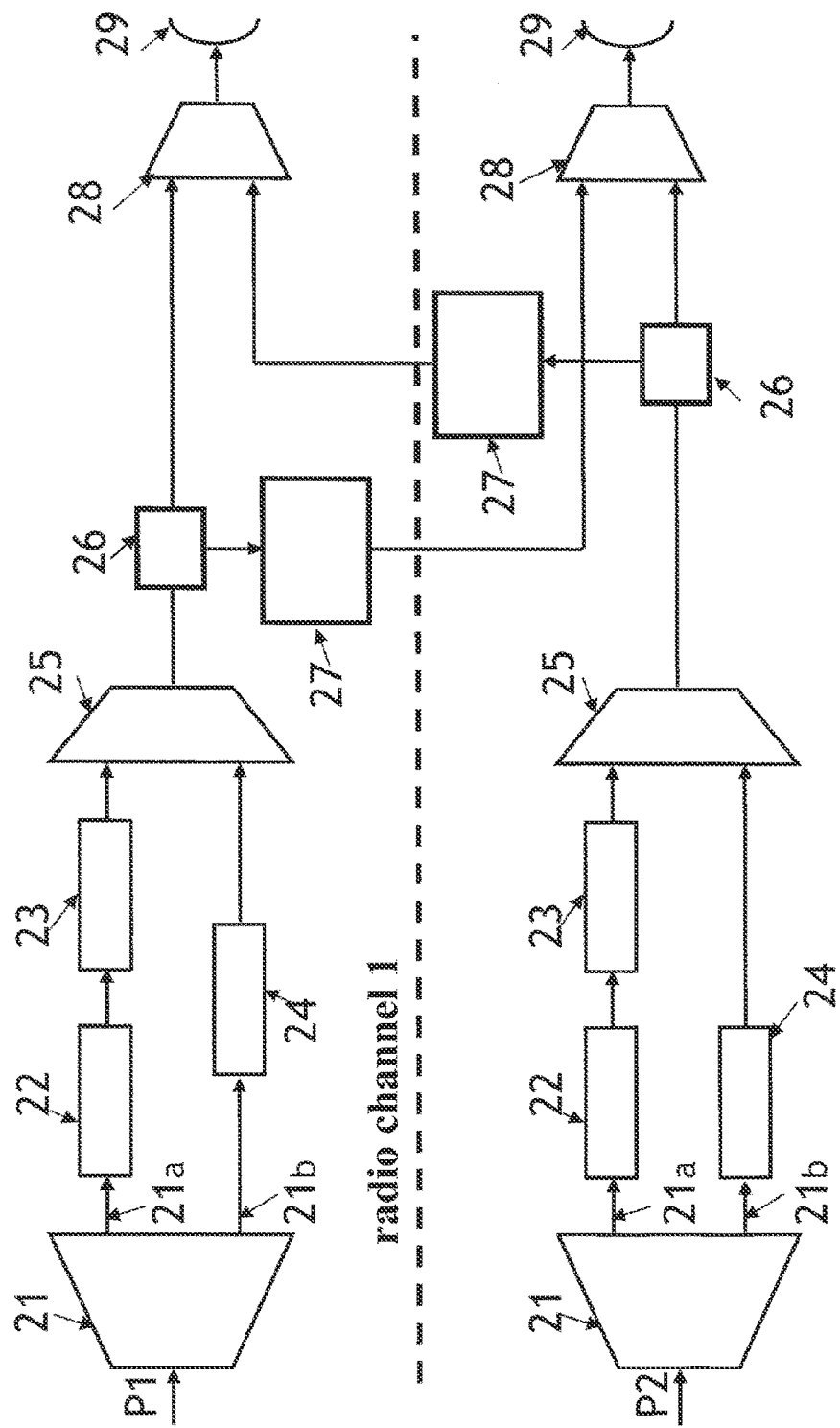
FIG. 2 is an exemplary schematic representation of a transmitter configured to perform protection switching at transmitter side according to embodiments of the invention.

Referring now to FIG. 2 a transmitter 20 configured to perform selective protection switching between radio channel 1 and radio channel 2 is shown. It is to be noted that although the use of two channels is shown, as a typical scenario, the solution proposed herein may also be used where more than two channels are used.

As can be seen in the example of FIG. 2, the transmitter 20 has a symmetrical structure with respect to the elements used for the processing of channel 1 and channel 2. Therefore for the sake of briefness only elements and processes with respect to channel 1 will be discussed herein, while emphasize is made in that a similar discussion is applicable to channel 2.

Referring to FIG. 2, a flow of packets P1 is assumed to be input into a classifier 21 on radio channel 1 (and flow P2 may be input into radio channel 2). The classifier 21 is in charge of classifying the class of services and recognizing the packets in order to detect which packets correspond to protected flows and which packets correspond to unprotected flows. The thus classified protected packets are then output form output port 21a of the classifier and input into a marking unit 22 for identifying and marking the packets as protected ones. Next a sequencer 23 adds a sequence number to each packet.

The unprotected packets are output from output port 21b of the classifier 21 and input into another marking unit 24 for identifying and marking the packets as unprotected ones.

The respective outputs from units 23 and 24 are multiplexed in a multiplexer 25 which provides at an output thereof a multiplexed flow comprising protected and unprotected packets which is directed toward an output multiplexer 28 in order to be transmitted using an antenna 29. As those skilled in the related art would realize, in occasions the multiplexed flow output from multiplexer 28 may only comprise protected flows, or unprotected flows depending on circumstances.

In case of need, for example presence of faulty conditions in channel, say channel 1, the multiplexed flow output from multiplexer 28 in that channel is duplicated (by known means) at a duplicator 26 downstream of the multiplexer 25 such that said duplicate flow of said multiplexed flow is directed toward the other channel, namely channel 2 in FIG. 2. In order to eliminate the duplication of the unprotected packets, a drop unit 27 is in charge of dropping unprotected packets from the flow, thereby maintaining only the protected packets on the flow. The duplicated flow of protected packets is then fed into the multiplexer 28 of channel 2 to which it is directed to and transmitted from an antenna 29.

The transmitter may comprise a modulation selector for applying a modulation scheme to the channel over which the protected or unprotected or a combination thereof are to be transmitted. Such modulation scheme is selected at least according to the status of propagation of packets on a radio link. Other criteria for modulation may be the class of services allocated to the packets. Preferably adaptive coding modulation is used for determining the modulation schemes of each channel.

The above description in relation to FIG. 2 related to providing the 1+1 protection, especially in case of presence of a faulty condition. However, embodiments of the invention provide the possibility of transmitting the protected packets only on one radio channel (say channel 1). This may be the case where faulty conditions are not present in transmission. In such cases, the transmission of protected packets is performed only on one channel and the unprotected channels are transmitted over the remaining bandwidth capacities of channels 1 or 2 as already discussed in relation to FIG. 1. The transmission of unprotected packets may be performed based on specific transmission criteria such as for example static configuration, hash algorithm based on MAC or IP header, load balancing algorithm and the like.

Figure 3:
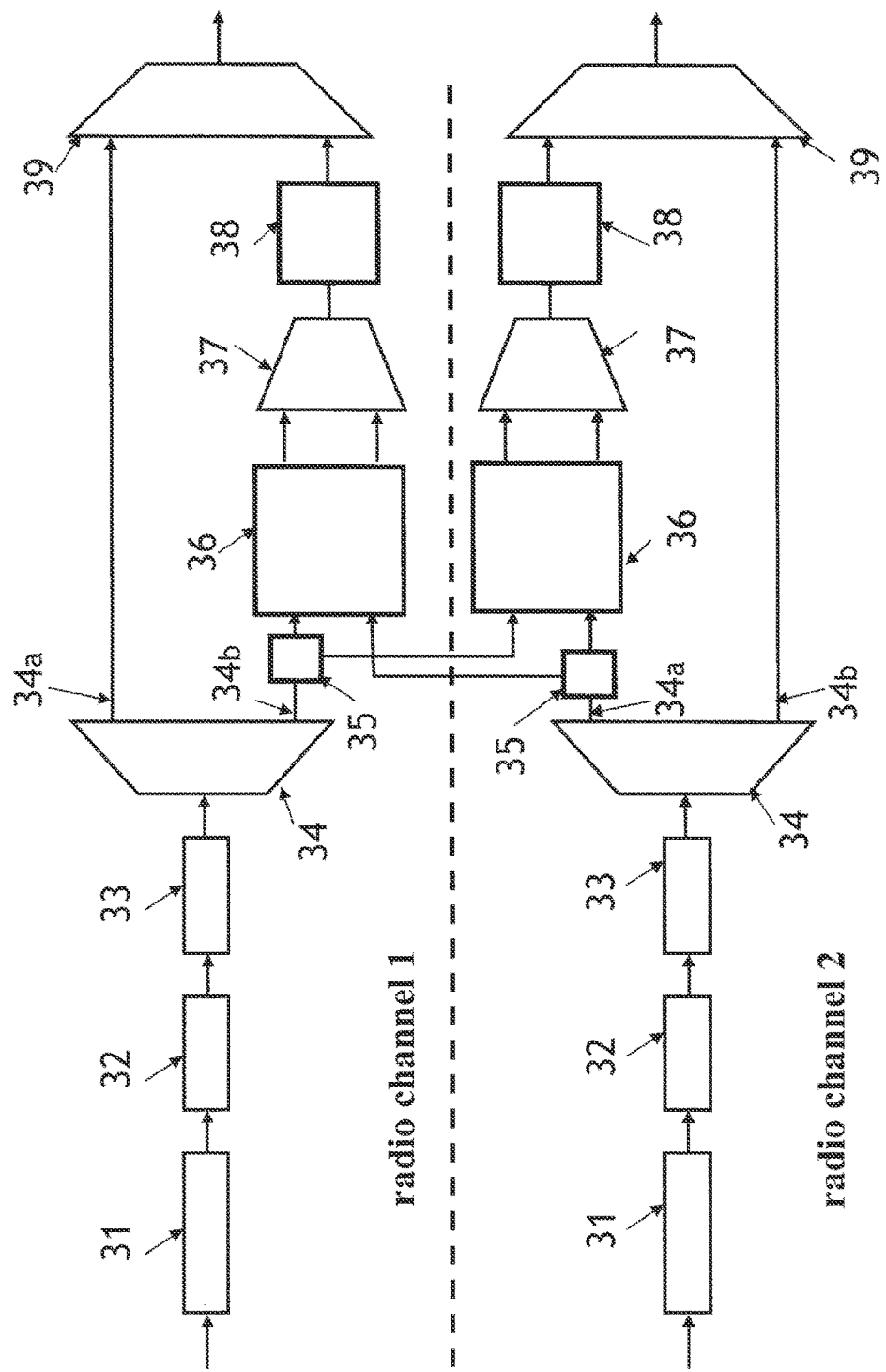
FIG. 3 is an exemplary schematic representation of a receiver configured to perform protection switching at receiving side according to embodiments of the invention.

FIG. 3 is an exemplary schematic representation of a receiver 30 configured to perform reception in a protection switching scenario according to embodiments of the invention. Here again, similar to the transmitter of FIG. 2, the structure is symmetrical and thus only elements and processes related to channel 1 will be discussed.

The receiver 30 is configured to receive multiplexed flows of protected and/or unprotected packets P1 in channel 1 or P2 in cannel 2. Such flows are then forwarded to a link estimation and radio alarm unit 31 which is in charge of associating to each packet an indicator representing the status of the radio link in terms of any possible degradation the link may cause on the traffic. Such status may be related to the mean square error (MES) and the forward error correction (FEC) stress of the signal at the reception of the packet.

The multiplexed received flow is then fed into a unit 32 for extracting timeslots and a subsequent unit 33 for attaching a link quality tag on the multiplexed flow. Next the multiplexed flow is input into a demultiplexer 34 which separates the multiplexed flow of packets into a protected flow and unprotected flow. The unprotected flow is output from a first output port 34a and proceeds to further stages of the circuit, for example to multiplexer 39. Such unprotected traffic is simply reassembled in a single flow.

The protected flow is output at a second output port 34b and input into a flow aligner and latency compensation unit 36 which is in charge of compensating differences in latency experienced by two duplicated protected packets as different radio links may have different propagation times.

The output of the aligner latency compensation unit 36 is input into a selector unit 37 in charge of selecting the flows according to their link quality tag attached by unit 34. Once the selection is done, lower quality protected packets (as compared to the duplicated protected packets on the other channel) may be dropped from the flow in drop/on-board unit 38. If such flow is not dropped it is subsequently output to further stages of the circuit, for example to multiplexer 39. Conversely if such flow is dropped, meaning that the flow output from the selector unit 37 of the other channel is considered the active channel, then the latter flow is output to further stages of the circuit.

It is to be noted that the outputs of each of the selector units 37 on the two channels may be exactly or substantially the same, however in order to ensure that traffic is not duplicated, the output of one of the two selector units 37 is dropped according to specific configuration.

The flow output from the output port 34b of demultiplexer 34 is duplicated (by known means) at a duplicator 35 downstream of the multiplexer 34 such that a multiplexed flow is directed from one channel, for example radio channel 1, toward the flow aligner and latency compensation unit 36 of radio channel 1 and a duplicate of such multiplexed flow is directed toward a corresponding flow aligner and latency compensation unit 36 on radio channel 2 where a similar process is performed as that discussed in relation to the flow aligner and latency compensation unit 36 of channel 1 and subsequent stages are performed on the flow.

In case adaptive coded modulation is used, and in normal propagation conditions (therefore only one channel transmits the protected packets), the aligner unit 36 and the selector unit 37 may work only on protected packets received from that radio channel.

In this manner a solution is provided for selective flow protection of packet to be transmitted over links that allows for a substantial improvement in efficient use of radio resource.

Elements as discussed in relation to the figures may include blocks which can be hardware devices, software modules or combination of hardware devices and software modules the use of which being known to persons skilled in the art and including means such as an Application Specific Integrated Circuit (ASIC), a Field Programmable Gate Array (FPGA) and/or a microprocessor, and in a preferred embodiment through or together with a software program like Very high speed integrated circuit Hardware Description Language (VHDL) or C programming language. Therefore, it is understood that the scope of the protection is extended to such a program and in addition to a computer readable means having a message therein, such computer readable storage means contain program code means for the implementation of one or more steps of the method, when this program is run on a computer, an ASIC, an FPGA or a microprocessor.

It is further to be noted that the order of the steps of the method of the invention as described and recited in the corresponding claims is not limited to the order as presented and described and may vary without departing from the scope of the invention.

The invention claimed is:
1. A method comprising the steps of:
verifying a status of propagation of packets on a first radio link and a second radio link in order to detect a faulty condition;

if no faulty condition is detected, transmitting a protected packet over the first radio link wherein the transmission occupies a first portion of available bandwidth of the first radio link, transmitting unprotected packets on at least part of a remainder of the available bandwidth of the first radio link and on at least part of available bandwidth of the second radio link, and not transmitting a duplicate of the protected packet over the second radio link; and if a faulty condition is detected, transmitting the protected packet over the first radio link wherein the transmission occupies the first portion of available bandwidth on the first radio link, transmitting the duplicate of the protected packet over the second radio link wherein the transmission occupies a second portion of available bandwidth of the second radio link, and transmitting unprotected packets on at least part of the remainder of the available bandwidth of the first radio link and at least part of a remainder of the available bandwidth of the second radio link.

2. The method of claim 1 wherein the transmission on the first radio link and the second radio link is performed using adaptive modulation and coding.

3. The method of claim 2 wherein a modulation scheme used for transmission on the first radio link is chosen independently from the modulation scheme used for transmission on the second radio link.

4. The method of claim 2 wherein a modulation scheme is selected so as to ensure a reliable transmission of protected packets.

5. The method of claim 1, wherein verifying the status of propagation of the packets on the first radio link and the second radio link comprises sampling a mean square error and a forward error correction stress of the signal.

6. The method of claim 1, wherein said minimum threshold value for the bit error rate is about 1e-9.

7. A transmitter comprising:
 a classifier for detecting packets to be protected in transmission and packets not to be protected in transmission;
 a marking unit for identifying and marking the packets;
 a duplicator for duplicating the packets to be protected;
 a drop unit for dropping unprotected packets; and
 a modulation selector for applying a modulation scheme to a radio link, said modulation scheme being selected at least according to a status of propagation of packets on a radio link;
wherein the transmitter is configured for transmitting a protected packet over the first radio link wherein the transmission occupies a first portion of available bandwidth of the first radio link, transmitting a duplicate of the protected packet over the second radio link wherein the transmission occupies a second portion of available bandwidth of the second radio link, and transmitting unprotected packets on at least part of a remainder of the available bandwidth of the first radio link and at least part of a remainder of the available bandwidth of the second radio link;

wherein the transmitter transmits the protected packet over the first radio link and does not transmit the duplicate of the protected packet over the second radio link when there is a no fault condition; and wherein the transmitter transmits the protected packet over the first radio link and transmits the duplicate of the protected packet over the second radio link when there is a fault condition.

8. A receiver for receiving packets over radio communication links, comprising:
 a link estimation unit for estimating a status of a radio link and associating to a packet an indicator representing the status of the radio link;
 a demultiplexer for separating a multiplexed flow of packets into a protected flow and an unprotected flow;
 a selector unit for selecting a flow according to the indicator; and
 a duplicator for duplicating the protected flow and forwarding a first protected flow to a first flow aligner and latency compensation unit and a duplicate protected flow to a second flow aligner and latency compensation unit;
wherein the receiver receives protected packets over a first radio link and does not receive duplicated protected packets over a second radio link when there is a no fault condition; and wherein the receivers receives protected packets over the first radio link and duplicated protected packets over a second radio link when there is a fault condition.

9. The receiver of claim 8 wherein the selector unit is configured for selecting the protected flow.

10. The receiver of claim 8 wherein the status of the radio link is obtainable by sampling mean square error and forward error correction stress.

11. The receiver of claim 8, wherein the link estimation unit is configured for estimating the status of the radio link by sampling mean square error and forward error correction stress.

* * * * *